United States Patent
Treptow et al.

(10) Patent No.: US 11,623,580 B2
(45) Date of Patent: Apr. 11, 2023

(54) CARGO CARRIER FOR A VEHICLE (71) Applicant: Thule Sweden AB, Hillerstorp (SE)

(72) Inventors: John-Patrik Treptow, Anderstorp (SE); Urban Stark, Vaggaryd (SE); Filip Wärnelöv, Värnamo (SE); Sebastian Parsmo, Jönköping (SE)

(73) Assignee: Thule Sweden AB, Hillerstorp (SE)

(*) Notice: Subject to any disclaimer, the term of this patent is extended or adjusted under 35 U.S.C. 154(b) by 16 days.

(21) Appl. No.: 16/986,013

(22) Filed: Aug. 5, 2020

(65) Prior Publication Data
US 2021/0170954 A1 Jun. 10, 2021

(30) Foreign Application Priority Data
Dec. 4, 2019 (EP) .................................... 19213430

(51) Int. Cl.
*B60R 9/055* (2006.01)
(52) U.S. Cl.
CPC .................................. *B60R 9/055* (2013.01)
(58) Field of Classification Search
CPC .................................. B60R 9/055; B60R 9/05
See application file for complete search history.

(56) References Cited

U.S. PATENT DOCUMENTS

| | | | | |
|---|---|---|---|---|
| 3,807,787 A * | 4/1974 | Gotz | ................... | B62D 35/001 296/91 |
| 4,006,931 A * | 2/1977 | Groves | ............... | B62D 35/001 296/180.3 |
| 4,136,464 A * | 1/1979 | Hay | ........................ | A47L 23/20 239/274 |
| 4,320,920 A * | 3/1982 | Goudey | ............... | B62D 35/001 296/180.4 |
| 5,171,057 A * | 12/1992 | Sharp | ........................ | B60S 1/56 296/180.4 |
| 9,266,405 B1 * | 2/2016 | Blanchard | .............. | B60H 1/245 |
| 10,118,564 B2 * | 11/2018 | Clark | ........................ | B60R 9/05 |
| 10,286,853 B1 * | 5/2019 | Carbone | ................ | B60R 9/055 |
| 10,583,785 B1 * | 3/2020 | Bulcher | .................... | B60R 9/08 |
| 10,625,588 B2 * | 4/2020 | Gurley | ..................... | B60J 11/04 |

(Continued)

FOREIGN PATENT DOCUMENTS

| | | |
|---|---|---|
| DE | 19524976 C1 | 1/1997 |
| EP | 2995503 A1 | 3/2016 |
| GB | 2407306 A | 4/2005 |

OTHER PUBLICATIONS

Search Report for European Application No. 19213430.2, European Patent Office, dated Apr. 8, 2020, 2 pages.

*Primary Examiner* — Derek J Battisti
(74) *Attorney, Agent, or Firm* — Sterne, Kessler, Goldstein & Fox P.L.L.C.

(57) ABSTRACT

The present disclosure relates to a cargo carrier for a vehicle, in particular a rooftop cargo carrier, for stowing goods to be transported therein. The cargo carrier comprises a base and a lid, which are moveable with respect to each other to adjust the cargo carrier between a closed and an open state. Further, the cargo carrier comprises an air channel for purging air from an interface region formed between the base and the lid in the closed state at a front portion of the cargo carrier, preferably to reduce a force caused by a headwind that acts to spread the base and the lid apart in the interface region.

19 Claims, 6 Drawing Sheets

(56) References Cited

U.S. PATENT DOCUMENTS

| | | | |
|---|---|---|---|
| 2005/0194414 A1* | 9/2005 | Lynch | B60R 9/055 224/401 |
| 2009/0308902 A1* | 12/2009 | Rex | B60R 9/055 224/315 |
| 2014/0097219 A1 | 4/2014 | Reiber | |

* cited by examiner

CARGO CARRIER FOR A VEHICLE

CROSS REFERENCE TO RELATED APPLICATION

This application claims priority to EP Application No. 19213430.2, filed Dec. 4, 2019, which is hereby incorporated herein in its entirety by reference.

TECHNICAL FIELD

The present disclosure relates to a cargo carrier for a vehicle, in particular a rooftop cargo carrier. The cargo carrier may be used for stowing goods to be transported therein so that additional cargo space may be provided to a vehicle. For example, the cargo carrier may be attached to a roof rack of a car.

BACKGROUND

A cargo carrier allows for transportation of additional cargo, in particular bulky items, with a motor vehicle. One common requirement for the cargo carrier is that the transported cargo may be stored safely. Usually, this requires the cargo to be stored dry and protected from the environment. US 2009/0308902 A1 relates to a container for attachment to a vehicle that is suitable for transporting a surfboard. The container is provided with an air inlet aperture and an air exhaust aperture for drying items in the container. EP 2 995 503 A1 relates to a roof box for carriage of luggage on the roof of a motor vehicle comprising a venturi effect device. GB 2 407 306 A relates to a roof box with a sunscreen panel that prevents a main cover from heating in the sun.

SUMMARY

A first aspect of the present disclosure relates to a cargo carrier for a vehicle for stowing goods to be transported therein. In particular, the cargo carrier may be configured as a rooftop cargo carrier. The vehicle may be a motor vehicle, e.g. a car, van, RV, caravan or truck. It is also possible that the cargo carrier is attachable to the bed of a pickup truck. The vehicle may also be a ship or other type of vehicle. The cargo carrier comprises a base and a lid, which are moveable with respect to each other to adjust the cargo carrier between a closed and an open state. The lid and the base may form an interior cargo space that allows the safe storage of cargo. In the open state, cargo may be stored in the cargo carrier or may be taken out of the cargo carrier. In the closed state, the lid and the base may essentially enclose the interior cargo space. The lid may form a top part of the cargo carrier in its intended mounting position. The base may form a bottom part of the cargo carrier in its intended mounting position. The cargo carrier may comprise means for attachment to a vehicle, in particular its roof. For example, the means for attachment may be configured as a quick release clamp for attachment to a roof rack. Preferably, the means for attachment are arranged on the base. The cargo carrier may comprise locking means that releasably fix the lid to the base in the closed state. The base and/or the lid may be formed from a plastic material, in particular in an injection molding process.

The cargo carrier further comprises an air channel for purging air from an interface region formed between the base and the lid in the closed state at a front portion of the cargo carrier. Preferably, the purging of air from the interface region at the front portion reduces a force caused by a headwind that acts to spread the base and the lid apart in the interface region. In particular, an interface region between the lid and the base may be essentially sealed against fluid, such as water, passing therethrough in the closed state. The interface region may relate to a joint and/or seam of the cargo carrier and/or to adjacent edges of the lid and the base. The interface region may be a region where the lid and the base can be moved apart to adjust the cargo carrier from the closed state to the open state. The interface region may be a region where the lid and the base are in contact with each other in the closed state. The air channel may be formed by the base and/or the lid or the air channel may be provided with at least one separate component. The front portion may be defined as a section of the cargo carrier whose walls are at least partially forward facing and/or that are subject to a ram pressure due to headwind when driving the vehicle, to which the cargo carrier is mounted in the intended fashion, in a forward direction.

Cargo carriers may be subjected to a strong air stream, for example in the form of a headwind, especially during high velocities of the motor vehicle when attached thereto. When raining, or in other wet conditions, there is a risk that water may leak in through the interface region between the lid and the base. The headwind may cause the lid to at least slightly lift, thus compromising a sealing property of the interface between the lid and the base in the closed state. With the air channel and the purging of air from the interface region, such a seal impairing force on the cargo carrier is prevented or at least significantly reduced. Accordingly, the cargo carrier allows for very safe storage and transportation of cargo, in particular in wet conditions and/or at high travel speeds. Overall protection of the cargo from the environment is thus increased.

According to an embodiment of the cargo carrier, the air channel has at least one inlet formed in the base or the lid at the front portion of the cargo carrier. The inlet may allow an airstream due to a forward movement of the vehicle to enter the air channel, thus preventing said airstream from pushing, in particular lifting, the lid from the base or at least reducing said effect. The airstream may also carry other fluids, such as water. In wet conditions, such as during rain, the air channel may also reduce the total amount of water acting on the interface region. The probability of water ingress is thus further reduced. The inlet may also be understood as reducing the effective surface area of the front portion of the cargo carrier that is subject to the headwind. An inlet may be formed by an aperture, in particular in a wall of the base and/or the lid.

Preferably, the air channel has a plurality of spaced apart inlets formed in the front portion of the cargo carrier. For example, the air channel may have between 6 to 18 separate inlets. Each inlet may therefore allow an airstream to enter the air channel. A plurality of inlets may allow air to be purged from a larger and/or different regions in the front portion of the cargo carrier. In particular, the inlets may be arranged adjacent to regions of the front portion that may be subject to very high ram air pressure, such as surface areas arranged essentially perpendicular to a forward driving direction and thus the headwind. Furthermore, the provision of separate inlets enhances mechanical stability of the cargo carrier.

In this specification, features and characteristics are usually described for a single inlet of the air channel. However, those features and characteristics may also be applied to some additional or all of the plurality of inlets if there is no statement to the contrary.

According to an embodiment of the cargo carrier, the inlet is formed in the interface region. Such an arrangement of the inlet is very effective for purging air from the interface region and preventing the lid and base from being spread apart by the headwind. Further, such an arrangement may render the inlet essentially invisible from outside of the cargo carrier in the closed state, in particular for a bystander with the cargo carrier mounted to the vehicle. In particular, the inlet may be invisible when the cargo carrier is mounted to the roof of a motor vehicle in its intended position. Further, the inlet may be protected from objects entering therein and from blockage by foreign objects, such as leaves. Formed in the interface region may be understood in such a way that the inlet is surrounded by walls of the lid and/or the base, e.g. portions of the walls, forming the interface region. If the inlet is formed by a wall instead of an aperture, said wall would form part of the interface region.

Preferably, the inlet at least partially extends along the interface region and/or faces in a forward direction. Such an arrangement is beneficial for purging of air from the interface region and reducing the force that acts to spread the lid and the base apart due to headwind. For example, the inlet may be formed as an elongated aperture, with a longer side being arranged essentially parallel to an extension of the interface region, e.g. in widthwise direction of the cargo carrier.

The inlet may also be formed adjacent the interface region. Such an arrangement may be easy to manufacture. Further, such an arrangement may prevent or at least reduce structural weakening of the walls of the cargo carrier forming the interface region with the apertures. The interface region may thus be very resilient to structural deformation. If the inlet is formed adjacent the interface region, it must be suitable for purging air from the interface region in the closed state of the cargo carrier.

According to an embodiment of the cargo carrier, the air channel has at least one outlet that is arranged in a portion of the cargo carrier different from the front portion of the cargo carrier. Such an arrangement of the outlet allows the air purged from the front portion to exit the air channel in another portion of the cargo carrier, in particular downstream with relation to the headwind. This allows an efficient aerodynamic design. The inlet and outlet may be defined by the airstream direction in the air channel, which is generated by a headwind when the cargo carrier is mounted in its intended orientation on the vehicle. Usually, a front of the cargo carrier is designed for aerodynamic efficiency, for example with a lot of surfaces angled to allow the headwind to smoothly flow around the cargo carrier.

The air channel may also have a plurality of outlets, in particular spaced-apart outlets. For example, the air channel may have between 10 and 20 separate outlets. In this specification, features and characteristics are usually described for a single outlet of the air channel. However, those features and characteristics may also be applied to some additional or all of the plurality of outlets if there is no statement to the contrary.

Preferably, the outlet is arranged in a side portion of the cargo carrier. Such an arrangement may allow for a short air channel. For example, the outlet may be arranged in a side wall of the cargo carrier. A short air channel may be cost-efficient to manufacture, may require only a small space and may only have little drag. Alternatively or additionally, the outlet is arranged below the inlet. Such an arrangement facilitates draining water from the air channel. For example, the outlet may be arranged adjacent to the front portion of the cargo carrier. The outlet may face away from a forward direction, preferably in a direction transversal to the forward direction, such as in a downward and/or backward direction. Such an arrangement may also promote airflow through the air channel due to a headwind when driving in a forward direction.

The outlet may also be arranged in a back portion of the cargo carrier. A back portion may primarily be formed by backward facing surfaces when the cargo carrier is mounted to the vehicle roof in its intended fashion. The arrangement of the outlet in the back portion may allow an essentially straight air channel or at least an air channel that only has curves with a large radius. Accordingly, an airstream, such as caused by the headwind, may pass through the air channel with only minimal deflection, enabling a low-drag design. Further, the back-portion may be a region with low external pressure during vehicle movement, resulting in a possible suction effect in the air channel.

According to an embodiment of the cargo carrier, the outlet is visible when the cargo carrier is mounted to the roof of the vehicle, e.g. a conventional passenger car, in its intended position. For example, a bystander, such as an average user, may be able to see the outlet when standing in front, behind and/or at a side of the motor vehicle. Such an arrangement allows easy inspection of the air channel. For example, a user may thus check whether the air channel is properly draining water and/or whether there are any foreign objects present in the air channel.

The inlet and/or the outlet may be configured with a turbulence and thus noise minimizing shape. For example, the outlet and/or the inlet may have a rounded and/or corner free shape, such as an oval shape. The air channel may extend from the front portion in a backwards direction. The air channel may be configured to guide a fluid, such as air and/or water, from its inlet to its outlet. Preferably, the air channel does not connect to the interior cargo space and/or is free of apertures except for the described inlets and/or outlets.

Preferably, the cargo carrier is free of any means of extracting energy from an airstream in the air channel, such as a turbine. The cargo carrier may comprise a plurality of air channels for purging air from the interface region, preferably to reduce the force caused by the headwind that acts to spread the base and the lid apart in the interface region. Each air channel may have a plurality of associated inlets and/or outlets. The air channel may be curved and/or have corners. For example, the air channel may curvedly extend around a front left and/or right corner of the cargo carrier to guide an airstream from the front portion to a side portion of the cargo carrier. The air channel preferably does not cross the transition region and/or crosses over from the lid to the base and vice versa.

According to an embodiment of the cargo carrier, an air channel inlet area is smaller than an air channel outlet area. The air channel inlet area may be defined by the sum of the areas of all apertures being configured as inlets. The air channel outlet area may be defined by the sum of the areas of all apertures being configured as outlets. Such a design may avoid a pressure build-up from air entering any inlet opening. Further, with the outlet area being lager than the inlet area, the air channel may have a nozzle effect that promotes purging of air from the front portion. Preferably, the air channel inlet area may be at least 5%, more preferably at least 10%, and most preferably at least 15% smaller than the air channel outlet area to reliably allow air purging from the interface region during forward vehicle movement. For example, the air channel inlet area may be about 13 cm$^2$ in total and the air channel outlet area may be 17 cm$^2$ in total for a medium sized cargo carrier. As an example for a large sized cargo carrier, the air channel inlet area may be about 16 cm² in total and the air channel outlet area may be 19 cm² in total.

According to an embodiment of the cargo carrier, the air channel is separate to an interior cargo space of the cargo carrier. Accordingly, any cargo arranged in the interior cargo space is also protected from the airstream in the air channel and potential dirt and water contained therein. For example, the air channel may be arranged in an interior space of the cargo carrier that is separate to the interior cargo space. Such an arrangement may protect the air channel and also allows an outside shape of the cargo carrier to be aerodynamically efficiently designed independently from the air channel extension and arrangement. As another example, the air channel may be formed by an additional channel component arranged in the interior cargo space of the cargo carrier. Any walls of the air channel may be water- and/or airtight.

According to an embodiment of the cargo carrier, the air channel is arranged between an outer wall and an inner wall of the cargo carrier. Such an arrangement offers protection for the air channel and/or the possibility to form the air channel with the outer and inner walls, thus not requiring any additional air channel parts. For example, at least part of the cargo carrier, such as the base, may have a dual wall design for aerodynamic reasons, increased stability and/or weight reduction. Such a design may thus have a synergy when also providing the air channel. The outer wall and inner wall may be formed by one piece. Alternatively, the outer wall and the inner wall may be provided by two separate pieces, which may be attached to each other. A space between the outer wall and the inner wall may be separate to the interior cargo space of the cargo carrier. For example, the inner wall may limit the interior cargo space of the cargo carrier. For example, the outer wall may form an outside surface of the cargo carrier. A space between the outer wall and inner wall may therefore be an additional interior space separate to the interior cargo space.

Preferably, the outer wall and the inner wall are an outer wall and an inner wall of the base, respectively. A dual wall design of the base may facilitate attachment to the vehicle and an aerodynamic design of the cargo carrier. For example, such a design may provide a flush transition between the lid and the base. Further, the dual wall base may withstand particular high loads, thus facilitating design of a cargo carrier with a high maximum weight capacity for the cargo. Alternatively, the outer wall and the inner wall may be an outer wall and an inner wall of the lid. Both the lid and the base may have a dual wall design. Preferably, the outer wall and the inner wall at least partially form a wall of the air channel. E.g., the outer and inner walls may constitute some or even all of the walls of the air channel. Such a design may be cost-efficient due to a smaller amount of required parts. Further, the interior cargo space may thus be large. The air channel may be completely formed by the outer wall and inner wall.

According to an embodiment of the cargo carrier, the base comprises an interior element limiting the interior cargo space of the cargo carrier, the interior element forming the inner wall, and an add-on element attached to the interior element, the add-on element forming the outer wall. Such a design may be resilient, aerodynamically efficient and not require any additional parts for the air channel. For example, the interior element may be formed as a through-shaped element, preferably providing the floor of the interior cargo space of the cargo carrier. Preferably, the interior element forms an inner wall of the air channel and/or the add-on element forms an outer wall of the air channel. Inner and outer may be defined with relation to the interior cargo space. The add-on element is preferably arranged on a side of the interior element opposite the interior cargo space of the cargo carrier and/or to at least partially surrounds the interior element. Alternatively or additionally, the lid may comprise an interior element limiting the interior cargo space of the cargo carrier, the interior element forming the inner wall, and an add-on element attached to the interior element, the add-on element forming the outer wall. The outer wall and the inner wall may also optionally be formed by a one-piece element of the base and/or the lid.

According to an embodiment of the cargo carrier, the inlet and/or the outlet of the air channel is formed in the outer wall. Such an arrangement facilitates design and production of the cargo carrier. Preferably, the inner wall is free of any inlet and/or outlet.

According to an embodiment of the cargo carrier, the air channel is formed by a hose. The hose is a fluid conducting element. The walls of the hose may be water- and/or airtight. The hose may be attached to an inlet aperture and/or outlet aperture in the cargo carrier. For example, the hose may be a flexible hose, such as a rubber hose. A flexible hose is resilient, easy to integrate into the cargo carrier and facilitates assembly. For example, the hose may also be rigid, such as a plastic or metal pipe. A rigid hose may be arranged in the interior cargo space to provide an air channel separate thereto without the risk of the rigid hose being blocked by cargo pressing thereon. Preferably, the hose is arranged in the interior cargo space of the cargo carrier. Alternatively, the hose may be arranged between the outer and inner wall.

According to an embodiment of the cargo carrier, in the closed state, a transition between the lid and the base in the interface region is configured as a flush transition. The flush transition may be defined as a plane transition. For example, there may be no step between an adjacent edge of the lid and the base. For example, the lid only projects as far as the base at the flush interface, in particular in the forward direction. The flush transition may comprise a gap between the lid and the base or may be gap free. The flush transition is preferably formed by the add-on part of the base and the lid. In a flush transition, there may be no outside overlap between the lid and the base. The flush transition may be aerodynamically efficient. Further, it may prevent injuries and damages during handling of the cargo carrier. For example, a flush transition may prevent textiles or fingers getting caught due to a lack of a projecting edge of the base or the lid in the closed state of the cargo carrier.

According to an embodiment, the cargo carrier comprises a sealing arrangement at the transition of the lid and the base. For example, the sealing arrangement comprises a sealing element, in particular a rubber gasket. Alternatively or additionally, the sealing arrangement may be configured as a labyrinth seal formed by the base and/or the lid. Together with the air channel, the sealing arrangement may provide excellent environmental protection for the interior cargo space in the closed state of the cargo carrier. For example, with such a design, just one central locking device spaced apart from the front, for example in a central position, may be sufficient to reliably seal the interior cargo space from water even at a high driving velocity. According to an alternative embodiment, the cargo carrier does not comprise a sealing arrangement.

According to an embodiment of the cargo carrier, the cargo carrier comprises a protective means preventing passage of objects above a predetermined size through the air channel. The protective means may prevent accumulation of foreign objects, such as dirt and leaves, in the air channel. The protective means may ensure that the air channel is not restricted and/or blocked by foreign objects. Preferably, the protective means is configured as a cover for the inlet and/or the outlet. Preferably, protective means are arranged both at the inlet and the outlet. Examples for protective means are a net, a grid and/or a mesh. The protective means may also be formed by a wall structure limiting outlet and/or inlet apertures and/or spaced apart outlets and/or inlets. For example, a plurality of outlets and/or inlets with a bar-like wall structure in between the outlets and/or inlets may form a grid that prevents passage of objects with a diameter much smaller than the total outlet and/or inlet area.

According to an embodiment of the cargo carrier, the inlet has a cross-sectional area between 0.5 cm$^2$ to 3 cm$^2$, preferably between 1 cm$^2$ and 2 cm$^2$, most preferably between 1 cm$^2$ and 1.5 cm$^2$, and/or the inlet has a maximum length between 5 cm to 30 cm, preferably between 10 cm and 25 cm, most preferably between 15 cm and 25 cm. Additionally or alternatively, the outlet has a cross-sectional area between 0.5 cm$^2$ to 3 cm$^2$, preferably between 1 cm$^2$ and 2 cm$^2$, most preferably between 1 cm$^2$ and 1.5 cm$^2$, and/or the outlet has a maximum length between 5 cm to 30 cm, preferably between 10 cm and 25 cm, most preferably between 15 cm and 25 cm. A shorter side of the inlet and/or outlet may have a length of between 2 cm and 10 cm, preferably between 4 cm and 7 cm. Such a design may enhance the air purging effect to prevent spreading apart of the lid and the base in case of a strong headwind. In case of a plurality of inlets, each may be similar or identical in size and/or shape. In case of a plurality of outlets, each may be similar or identical in size and/or shape. The inlet and outlet may be similar or identical in size, shape and/or number. However, the outlet may also be larger than the inlet and/or there may be a larger number of outlets than inlets.

According to an embodiment of the cargo carrier, the lid is hingedly coupled to the base, preferably at a side of the cargo carrier, to allow adjustment of the cargo carrier between the open state and the closed state with a pivoting motion. Such a coupling provides easy access to the interior cargo space from a side of the vehicle. Further, a large opening for handling of cargo may be provided in the open state.

A second aspect relates to a vehicle, preferably a motor vehicle, with the cargo carrier according to the first aspect mounted on the motor vehicle, in particular its roof. The cargo carrier allows for driving of the vehicle at high speeds without risking the sealing of the interior cargo space of the cargo carrier.

Another aspect relates to the following item: Cargo carrier for a vehicle, in particular rooftop cargo carrier, for stowing goods to be transported therein, comprising a base and a lid, which are moveable with respect to each other to adjust the cargo carrier between a closed and an open state, and an air channel, the air channel having: at least one inlet, wherein the inlet is formed in the base or the lid at a front portion of the cargo carrier, the inlet is arranged in or at an interface region formed between the base and the lid in the closed state at the front portion of the cargo carrier, and/or the inlet at least partially extends along the interface region and/or faces in a forward direction, and/or at least one outlet, wherein the outlet is arranged in a portion of the cargo carrier different from the front portion of the cargo carrier, preferably in a side portion of the cargo carrier, the outlet is arranged below the inlet, and/or the outlet is visible when the cargo carrier is mounted to the roof of the vehicle in its intended position, wherein the air channel is optionally arranged between an outer wall and an inner wall of the cargo carrier, wherein the inlet and/or the outlet of the air channel is formed in the outer wall.

Preferred embodiments and expedient developments of one aspect of the disclosure may also constitute preferred embodiments and expedient developments of other aspects of the disclosure. Other features of the present disclosure will be apparent from consideration of the information contained above as well as in or in combination with the following detailed description, drawings and claims. The present disclosure is illustrated by way of example, and not by way of limitation, in the figures of the accompanying drawings.

BRIEF DESCRIPTION OF THE DRAWINGS

FIG. 8 shows a first sectional view of the base according to FIG. 5a.

FIG. 9 shows a second sectional view of the base according to FIG. 5a.

DETAILED DESCRIPTION

Figure 1:
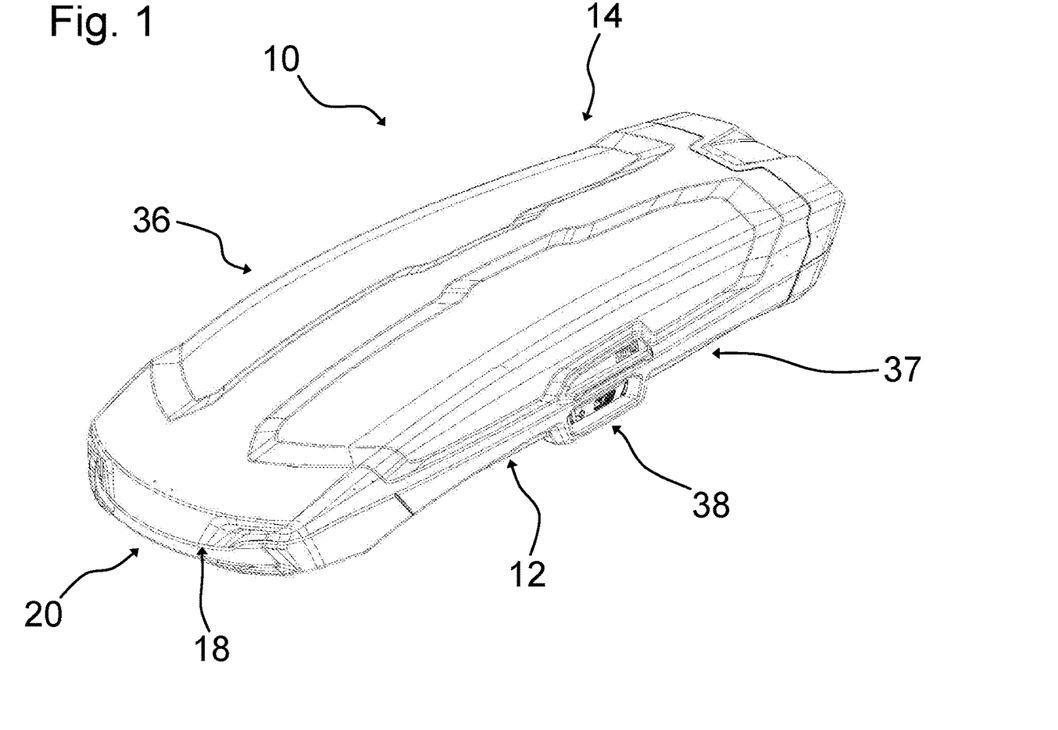
FIG. 1 shows a cargo carrier in a closed state in a perspective top view according to an embodiment of the present disclosure.
Figure 2:
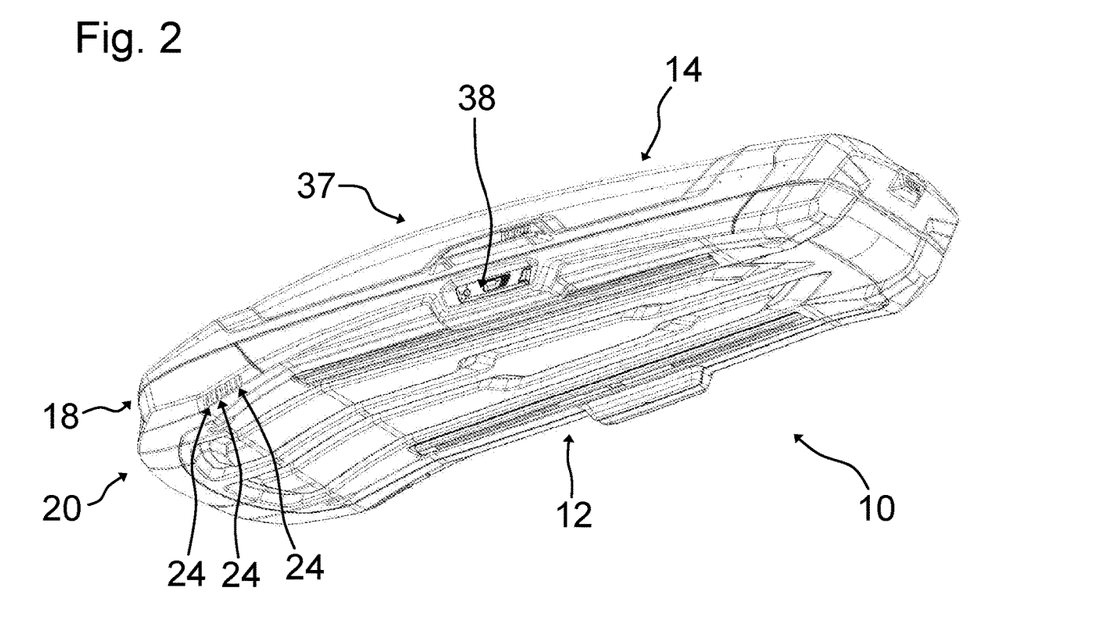
FIG. 2 shows the cargo carrier according to FIG. 1 in a perspective bottom view.
Figure 4:
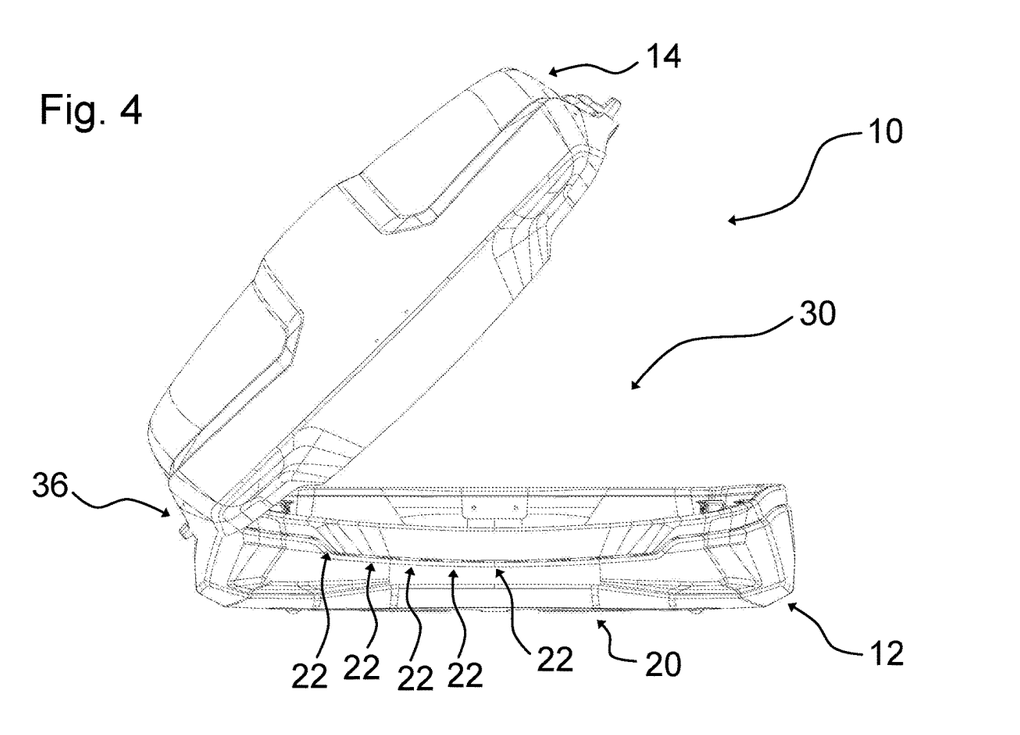
FIG. 4 shows the cargo carrier according to FIG. 1 in an open state in the same front view as FIG. 3.

FIG. 1 shows an embodiment of a cargo carrier 10 in a perspective top view. FIG. 2 shows the cargo carrier 10 in a bottom view. The cargo carrier 10 comprises a base 12 and a lid 14, which are moveable with respect to each other to adjust the cargo carrier 10 between a closed and an open state. For that purpose, the lid 14 is hingedly coupled with the base 12 at a right side 36 of the cargo carrier 10. Also a reverse configuration in which the coupling is provided at the left side is conceivable. FIG. 4 shows the cargo carrier 10 in its open position. For opening of the cargo carrier 10, the lid 14 is pivoted upwardly at a left side 37, which is situated opposite to the right side 36 of the cargo carrier 10. In the open state, cargo may be placed into an interior cargo space 30 and/or may be taken out of the interior cargo space 30. In the closed state, the lid 14 and the base 12 enclose the interior cargo space 30, thus protecting the cargo inside from the environment, such as from wind and rain.

The cargo carrier 10 is configured for being mounted to a rooftop of a motor vehicle. As can be seen in the perspective bottom view of the cargo carrier 10 according to FIG. 2, an underside of the base 12 is formed with recessed rails to attach the cargo carrier 10 to a rooftop rack of a motor vehicle. Specifically, mounting means may be provided in the recessed rails for mounting the cargo carrier 10 to a load carrier of a vehicle, e.g. to a crossbar of the load carrier. However, the cargo carrier 10 may comprise additional and/or different means for attachment to a motor vehicle.

The cargo carrier 10 is designed to be mounted to the motor vehicle with its elongated longitudinal extension being aligned with a forward-backward direction of the vehicle. A front portion 20 of the cargo carrier 10 is configured to be facing in the forward direction of the motor vehicle when mounted thereto in the intended fashion. In the presently shown embodiment, the front portion 20 has a streamlined design intended to have a low aerodynamic drag during forward driving of the vehicle. For that purpose, the outside surfaces of the front portion 20 are mostly angled backwards and designed with smooth curves to gently guide a headwind around the cargo carrier 10.

At the left side 37, the cargo carrier 10 comprises a locking arrangement 38. The locking arrangement 38 is configured to releasably lock the lid 14 with the base 12 in the closed state. The locking arrangement 38 can be operated to release a fixation of the lid 14 with the base 12, thus allowing the lid 14 to be pivoted upward and away from the base 12 in that area for opening the cargo carrier 10.

Figure 5A:
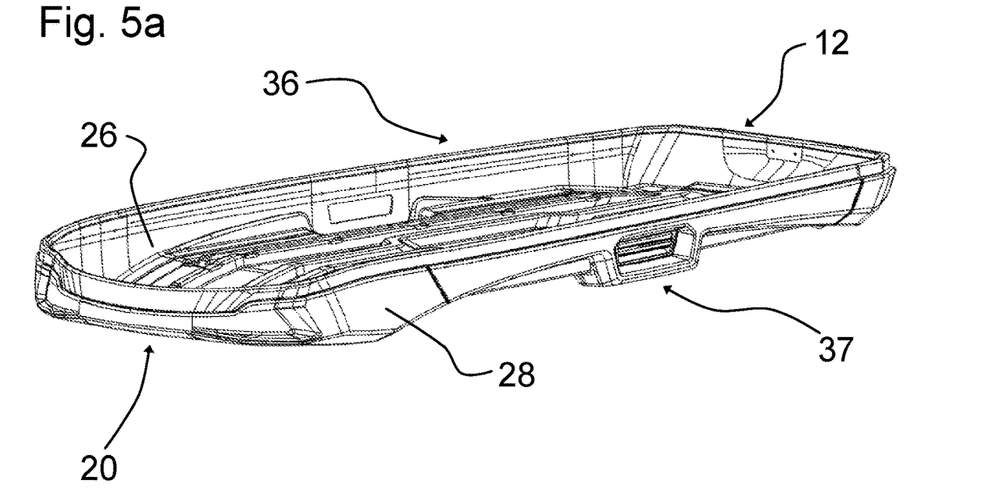
FIG. 5a shows a base of the cargo carrier according to FIG. 1 in a perspective view.
Figure 5B:
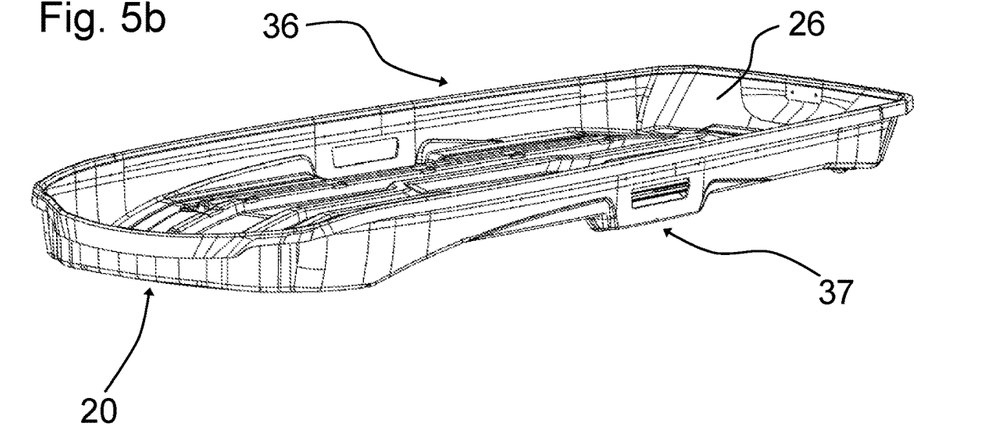
FIG. 5b shows an interior part of the base according to FIG. 5a in a perspective view.
Figure 5C:
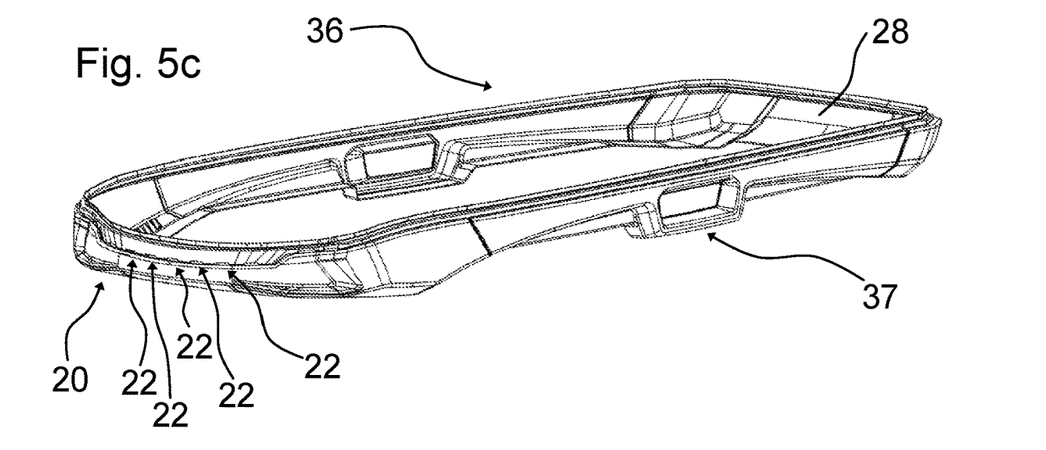
FIG. 5c shows an add-on part of the base according to FIG. 5a in a perspective view.

The base 12 comprises an interior element 26 and an add-on element 28, as can be taken from the perspective views of FIGS. 5a to 5c. FIG. 5a shows the add-on element 28 attached to the interior element 26. The add-on element 28 forms a kind of shroud around the interior element 26. The add-on element 28 allows a flush transition between the lid 14 and the base 12. Further, it may enhance the aerodynamic shape of the cargo carrier 10 while avoiding restricting the interior cargo space 30. In addition, the add-on element 28 may protect attachment means at the bottom of the cargo carrier 10 when placing the cargo carrier 10 on the ground by extending further downward than those attachment means. FIG. 5b shows the interior element 26 without the add-on element 28. As can be seen in FIG. 5b, the interior element 26 is a trough-shaped element that provides a bottom of the interior cargo space 30 and some of its side walls. The interior element 26 forms an inner wall that limits the interior cargo space 30. The add-on element 28 is shown by itself in the perspective view of FIG. 5c. The add-on element 28 when attached to the interior element 26 forms an outer wall of the base 12, the outer wall being arranged on a side of the interior element 26 facing away from the interior cargo space 30. Accordingly, the add-on element 28 does not limit the interior cargo space 30. Overall, the base 12 with the interior element 26 and the add-on element 28 has a dual wall design at least for its side walls. Such a dual wall construction may provide the same structural stiffness as a single wall construction with lesser weight.

Figure 3:
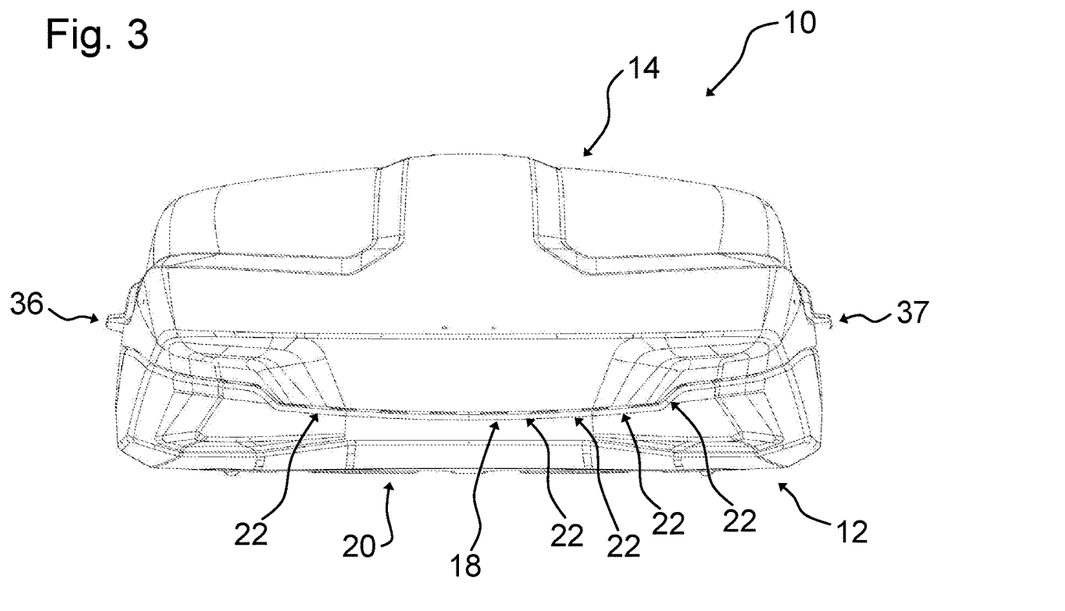
FIG. 3 shows the cargo carrier according to FIG. 1 in a front view.
Figure 8:
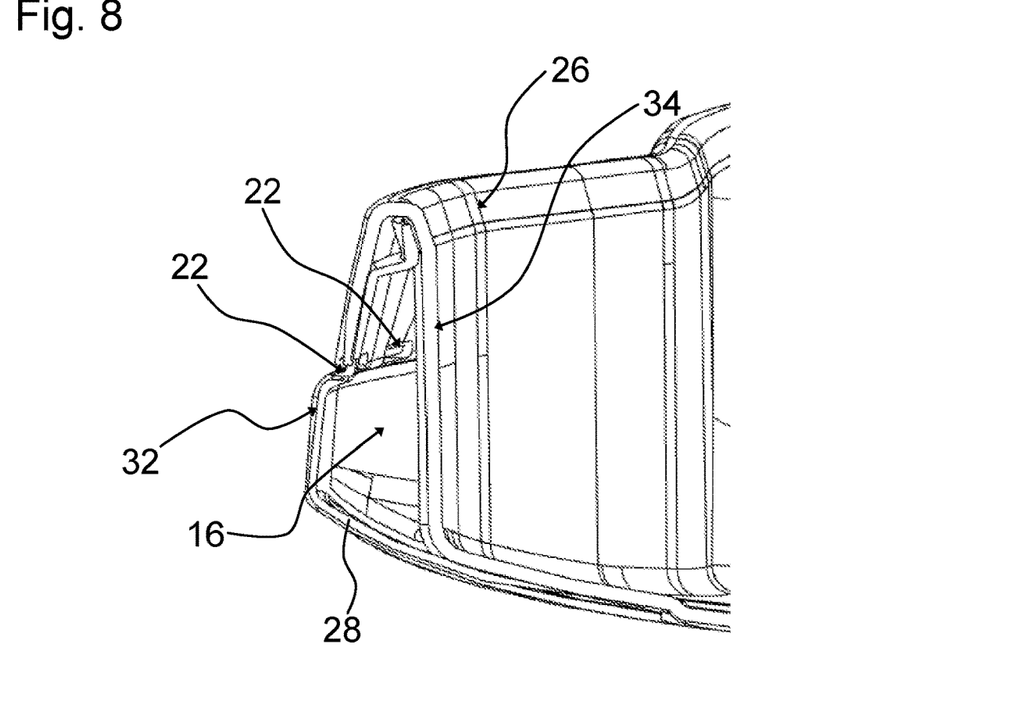

When driving with the cargo carrier 10 attached to the vehicle, its front portion 20 will be subject to strong headwinds, especially at high driving speeds. The headwind acting on the front portion 20 generates a force that acts to spread the base 12 and the lid 14 apart in an interface region 18. The interface region 18 may be defined as the region where an edge of the lid 14 and an edge of the base 12 meet or are arranged adjacent and parallel to each other in the closed state. For example, the interface region 18 may be easily identified in the front view of the cargo carrier 10 shown in FIG. 3. As can be seen in that view, there is a small slit-like gap between those edges. The headwind can create a pressure in that gap that acts to force the lid 14 and the base 12 apart. The interface between the lid 14 and the base 12 will be discussed in greater detail below, especially in conjunction with FIGS. 8 to 10.

To mitigate this issue, enhance cargo protection and to potentially render the cargo carrier 10 suitable for higher driving speeds, the cargo carrier 10 comprises an air channel 16. The air channel 16 is configured for purging air from the interface region 18, in particular during forward driving of the motor vehicle. Accordingly, the headwind may encounter a smaller effective surface area in the front portion 20 to create the force potentially spreading the lid 14 and the base 12 apart at the front portion 20. Further, a ram air pressure may be reduced at the front portion 20 due to the air channel 16.

Figure 6:
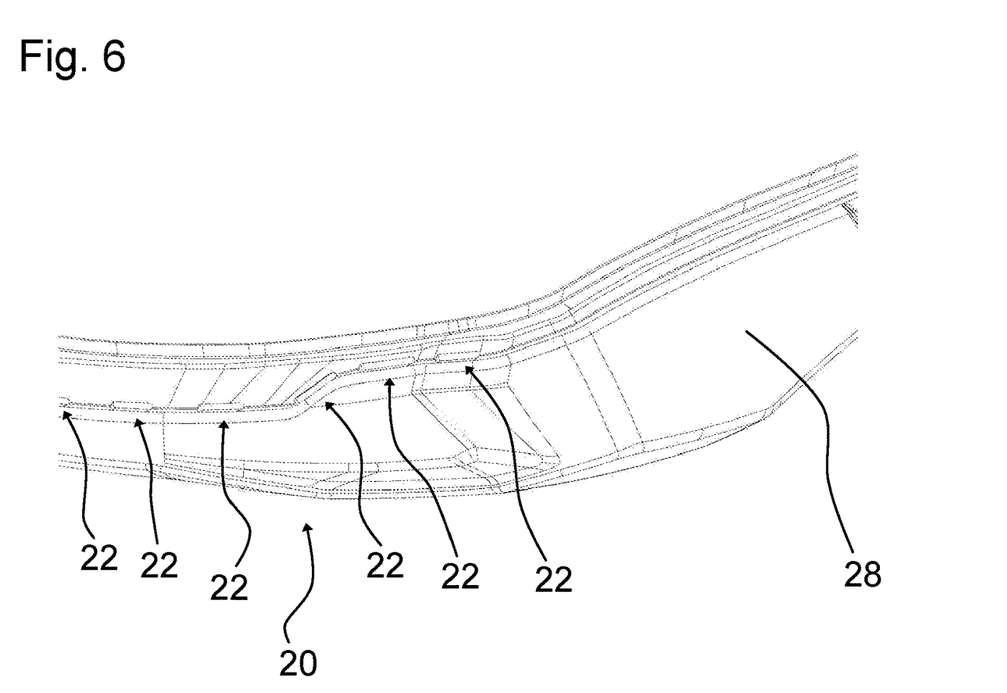
FIG. 6 shows a section of the add-on part according to FIG. 5c in a perspective top view.
Figure 7:
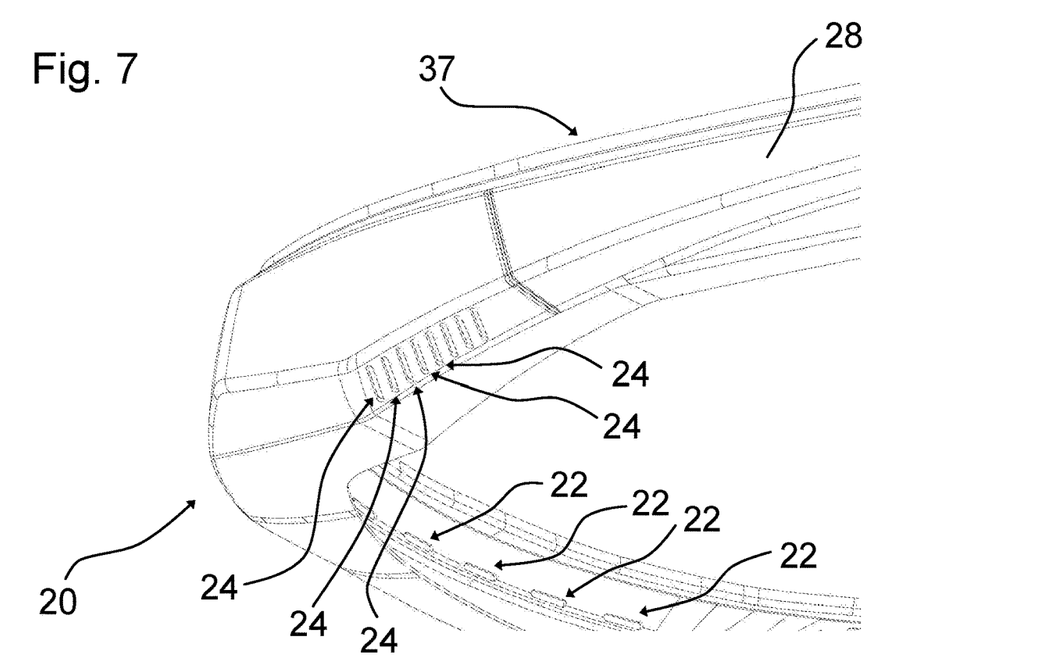
FIG. 7 shows a section of the add-on part according to FIG. 5c in a perspective view.

The air channel 16 has a plurality of inlets 22 arranged at the front portion 20 spaced apart from each other. Each inlet 22 is at least partially facing in a forward direction. The inlets 22 are shaped as elongated apertures in the add-on element 28 with rounded corners with their longer side aligned with the widthwise extension of the interface region 18. The inlets 22 are particularly easy to identify in FIG. 6, showing a section of the add-on element 28 from the front in a perspective view. An airstream will enter the inlets 22 from the front during forward driving, e.g. in a direction essentially into the image plane of FIG. 6. The inlets 22 may also be identified easily in FIG. 7, showing a section of the add-on element 28 from the back in a perspective view. The airstream will flow through the inlets 22 in a direction approximately from the left to the right in the image plane of FIG. 7.

Figure 10:
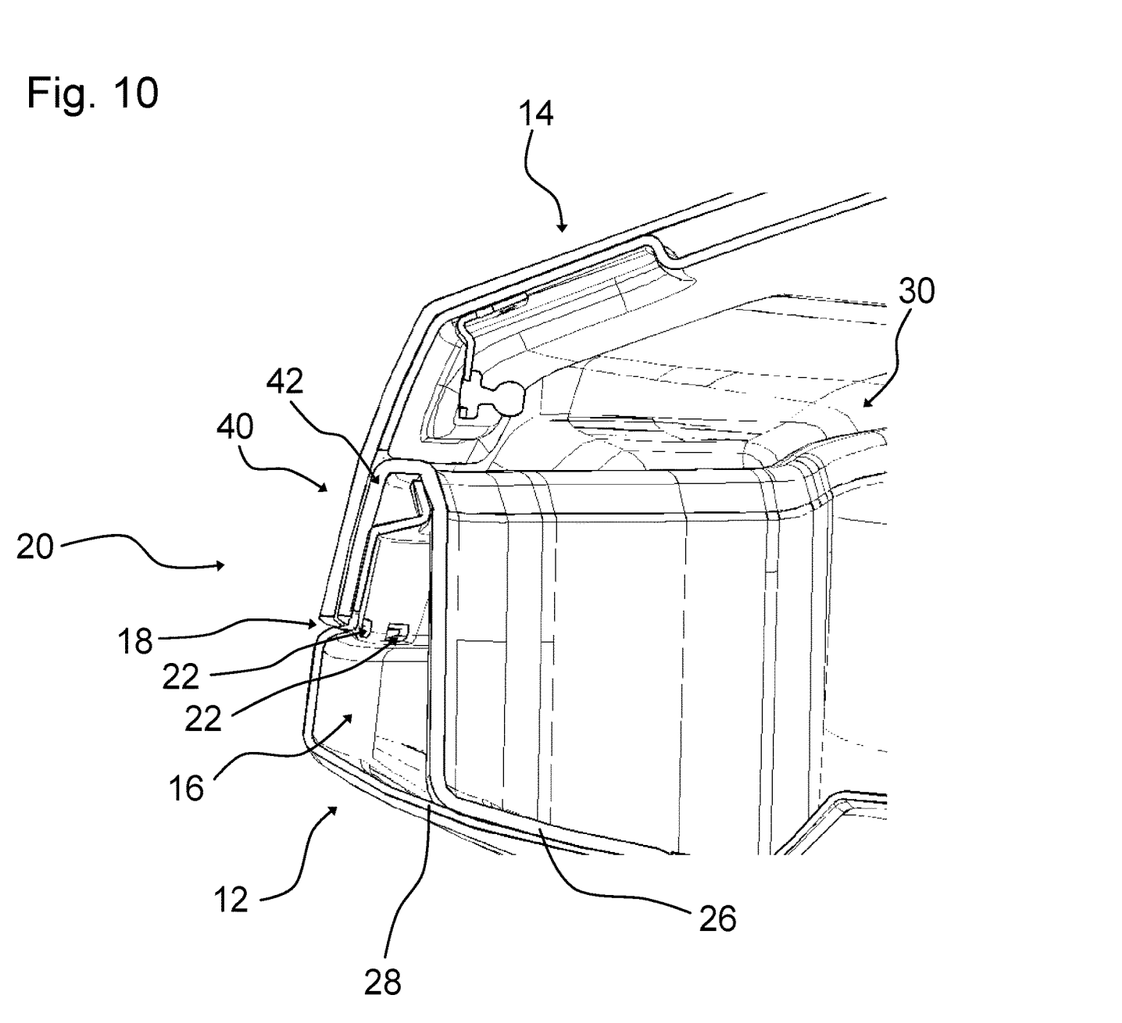
FIG. 10 shows a sectional view of the cargo carrier according to FIG. 1.

As can be taken from FIG. 10, essentially showing a section of the front portion 20 of the cargo carrier 10 in a sectional view along the longitudinal extension of the cargo carrier 10, the inlets 22 are somewhat shifted backwards relative to the most forward adjacent outer surface of the base 12. Accordingly, the air channel 16 primarily purges air that is pressing into the gap between the lid 14 and the base 12 in the interface region 18. Together with air that is pressed into this gap, the air channel 16 may also purge any water contained in the headwind, for example when it is raining. The air channel 16 therefore also provides a drainage for water in the interface region 18. Less water present in the interface region 18 also reduces the risk of water ingress into the interior cargo space 30. Further, the backward shift of the inlets 22 provides a form of visual protection, rendering the inlets 22 essentially invisible from a viewer not directly facing the front portion 20 at the level of the interface region 18 (see FIG. 3). Further, that backward shift provides some protection from foreign objects entering the air channel 16 and from catching on the inlets 22.

The air channel walls are provided by the add-on element 28 and the interior element 26. Specifically, an outer side of the interior element 26 forms an inner wall 34 of the air channel 16, e.g. the wall adjacent the interior cargo space 30. As can be taken from FIGS. 8 and 9, the air channel 16 is thus separate to the interior cargo space 30. An outer wall 32 of the air channel 16 is formed by an inner side of the add-on element 28. The air channel 16 is essentially closed with the exceptions of the inlets 22 and outlets 24. Both the inner side of the add-on element 28 and the outer side of the interior element 26 have a smooth surface area in the section forming the air channel 16 to provide an unrestricted pathway for an airstream therein and to minimize turbulences in the air channel 16.

Figure 9:
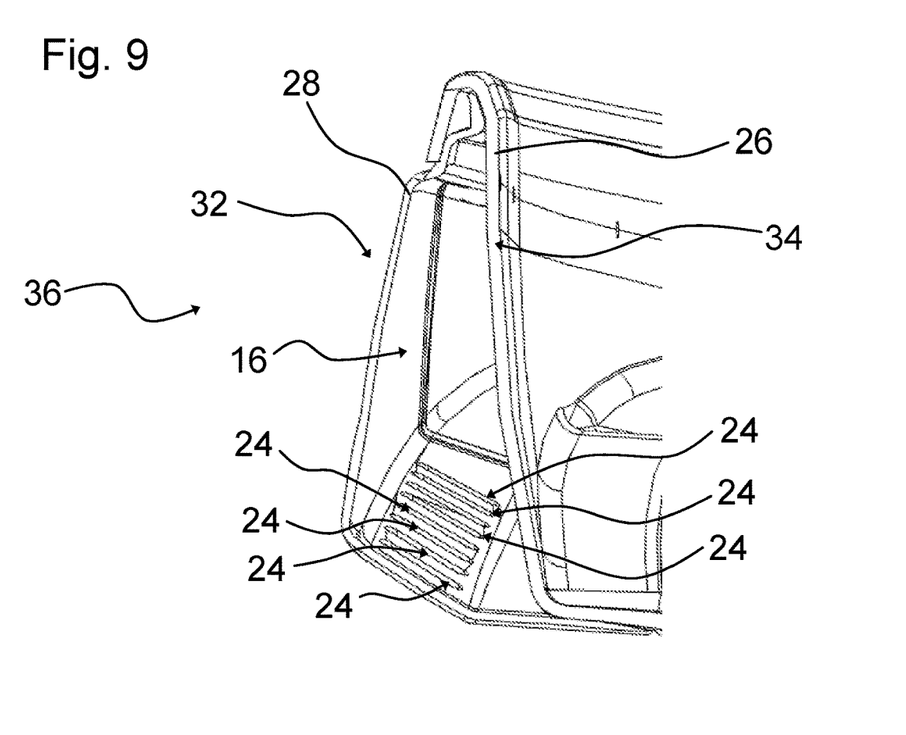

A plurality of outlets 24 of the air channel 16 may be identified best in FIG. 9, essentially showing a sectional view taken behind a forward corner of the cargo carrier 10 when viewed in roughly a forward direction. The outlets 24 are arranged backwards to and below the inlets 22 on both sides 36, 37 of the cargo carrier 10. The headwind entering the air channel 16 therefore follows a smooth backward path curved around the front corners of the cargo carrier 10, essentially being split in two airstreams in the air channel 16. Due to the outlets 24 being arranged below the inlets 22, water can easily drain from the air channel 16. Preferably, the outlets 24 are arranged at the lowest portion of the air channel 16 and/or the interior space formed between the add-on element 28 and the interior element 26.

As can be taken from FIG. 2, the outlets 24 are facing backwards and downwards in an outside surface of the cargo carrier 10, said outside surface being similarly angled. An area just outside the outlets 24 may therefore be an area of lower pressure than other regions outside the cargo carrier 10, thus enhancing an air purging effect at the front portion 20 via the air channel 16.

The outlets 24 are formed as elongated spaced apart apertures in the add-on element 28. The outlets 24 form a kind of grid that prevents large objects from entering the air channel 16, which could otherwise possibly obstruct the air channel 16. A total area of the outlets 24, in particular on both sides 36 of the cargo carrier 10, is preferably larger than a total area of all inlets 22 combined. Such a design may prevent pressure build up and backup of air in the air channel 16. In the shown embodiment, both the inlets 22 and the outlets 24 may have the same area of about 1.2 $cm^2$ each. To provide a larger overall air channel outlet area than an air channel inlet area, the cargo carrier 10 may be provided with a larger total number of outlets 24 than inlets 22. The outlets 24 are arranged adjacent the front portion 20 in a middle portion of the cargo carrier 10 at the right and left sides 36, 37, preferably at the front third of the middle portion. Alternatively, the outlets may also be arranged at a back portion, in particular at a spoiler area at a backside of the cargo carrier 10. Outside pressure at the spoiler area, in particular at the backside, may be low, also enhancing the air purging effect at the front portion 20.

As can be taken from the sectional view of the front portion 20 shown in FIG. 10, in the closed state, a transition between the lid 14 and the base 12 is essentially flush. A lower section 40 of the lid 14 is overlapping an upper section 42 of the base 12, potentially resting thereon. The upper section 42 of the base 12 may therefore support the lower section 40 of the lid 14 against deformation by the headwind. The lower edge of the lid 14, which is part of the interface region 18, extends as far forward as the adjacent edge of the add-on element 28. E.g., there is no step between an outer surface of the lid 14 and the base 12 in the interface region 18. Such a design may be aerodynamically beneficial. Water accumulating in the gap between the lid 14 and the base 12 in the interface region 18 may be pushed into the air channel 16 by the headwind. The inlets 22 and the air channel 16 purge air from the gap between the lid 14 and the base 12 in the interface region 18 to avoid an increase in pressure in the gap. E.g. the headwind may flow through the air channel 16 instead of being backed up and acting to force the lid 14 and the base 12 apart in the front portion 20.

What is claimed is:

1. A cargo carrier for a vehicle for stowing goods to be transported therein, the cargo carrier comprising:
    a base and a lid configured to form an interior cargo space in a closed state, wherein the base and the lid are moveable with respect to each other to adjust the cargo carrier between the closed state and an open state; and
    an air channel for purging air from an overlapping region formed between an upper edge of the base and a lower edge of the lid in the closed state at a front portion of the cargo carrier, the air channel configured to reduce a force caused by a headwind that acts to spread the base and the lid apart in the overlapping region.

2. The cargo carrier according to claim 1, wherein the air channel has at least one inlet formed in the base or the lid at the front portion of the cargo carrier.

3. The cargo carrier according to claim 2, wherein the inlet is formed in the overlapping region and at least partially extends along the overlapping region and/or faces in a forward direction.

4. The cargo carrier according to claim 2, wherein the air channel has at least one outlet that is arranged in a portion of the cargo carrier different from the front portion of the cargo carrier, and wherein the outlet is arranged in a side portion of the cargo carrier.

5. The cargo carrier according to claim 4, wherein the outlet is visible when the cargo carrier is mounted to a roof of the vehicle.

6. The cargo carrier according to claim 4, wherein an air channel inlet area is smaller than an air channel outlet area.

7. The cargo carrier according to claim 1, wherein the air channel is separate to the interior cargo space of the cargo carrier.

8. The cargo carrier according to claim 1, wherein the air channel is arranged between an outer wall and an inner wall of the cargo carrier, the outer wall and the inner wall being an outer wall and an inner wall of the base.

9. The cargo carrier according to claim 8, wherein the base comprises an interior element limiting an interior cargo space of the cargo carrier, the interior element forming the inner wall, and an add-on element attached to the interior element, the add-on element forming the outer wall.

10. The cargo carrier according to claim 8, wherein an inlet, an outlet, or both of the air channel is formed in the outer wall.

11. The cargo carrier according to claim 1, wherein the air channel is formed by a hose arranged in an interior cargo space of the cargo carrier.

12. The cargo carrier according to claim 9, wherein in the closed state, a transition between the lid and the base at an edge of the overlapping region is configured as a flush transition.

13. The cargo carrier according to claim 4, wherein the cargo carrier comprises a protective means preventing passage of objects above a predetermined size through the air channel, wherein the means is configured as a cover for the inlet.

14. The cargo carrier according to claim 2, wherein the inlet has a cross-sectional area between 0.5 $cm^2$ to 3 $cm^2$ and the inlet has a maximum length between 5 cm to 30 cm.

15. The cargo carrier according to claim 1, wherein the lid is hingedly coupled to the base, at a side of the cargo carrier, to allow adjustment of the cargo carrier between the open state and the closed state with a pivoting motion.

16. The cargo carrier according to claim 1, wherein the cargo carrier is a rooftop cargo carrier.

17. The cargo carrier according to claim 2, wherein the air channel comprises a plurality of spaced apart inlets formed in the front portion of the cargo carrier.

18. The cargo carrier according to claim 6, wherein the air channel inlet area is at least 5% smaller, or at least 10% smaller, or at least 15% smaller.

19. A cargo carrier for a vehicle for stowing goods to be transported therein, the cargo carrier comprising:
    a base and a lid configured to form an interior cargo space in a closed state, wherein the base and the lid are moveable with respect to each other to adjust the cargo carrier between the closed state and an open state, wherein the base and the lid define an overlapping region at a front portion of the cargo carrier when in the closed state; and an air channel at a front portion of the interior cargo space of the cargo carrier and configured for purging air from the overlapping region, and wherein the air channel defines a separate volume from the interior cargo space of the cargo carrier.

* * * * *

UNITED STATES PATENT AND TRADEMARK OFFICE
CERTIFICATE OF CORRECTION

PATENT NO. : 11,623,580 B2
APPLICATION NO. : 16/986013
DATED : April 11, 2023
INVENTOR(S) : Treptow et al.

It is certified that error appears in the above-identified patent and that said Letters Patent is hereby corrected as shown below:

On the Title Page

Column 1, Item (72), in "Inventors", Line 2, delete "Vaggaryd" and insert --Vaggeryd--, therefor.

Signed and Sealed this
Thirtieth Day of May, 2023

Katherine Kelly Vidal
*Director of the United States Patent and Trademark Office*